A. B. HECTOR.
PRODUCTION OF COLOR MUSIC AND OTHER LUMINOUS EFFECTS AND APPARATUS THEREFOR.
APPLICATION FILED JUNE 8, 1917.
1,432,552.
Patented Oct. 17, 1922.
5 SHEETS—SHEET 1.
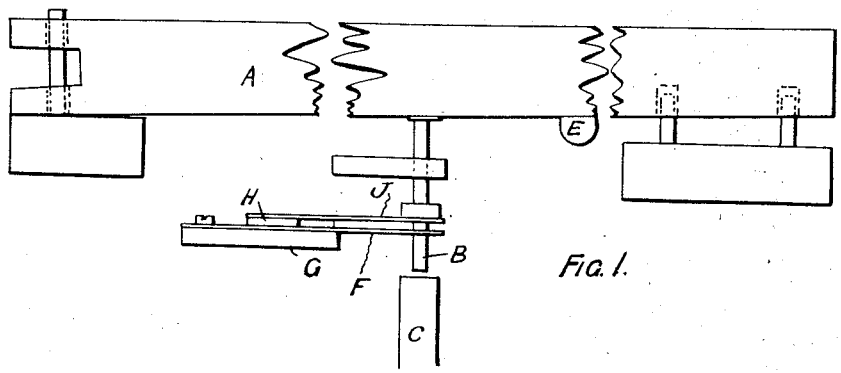
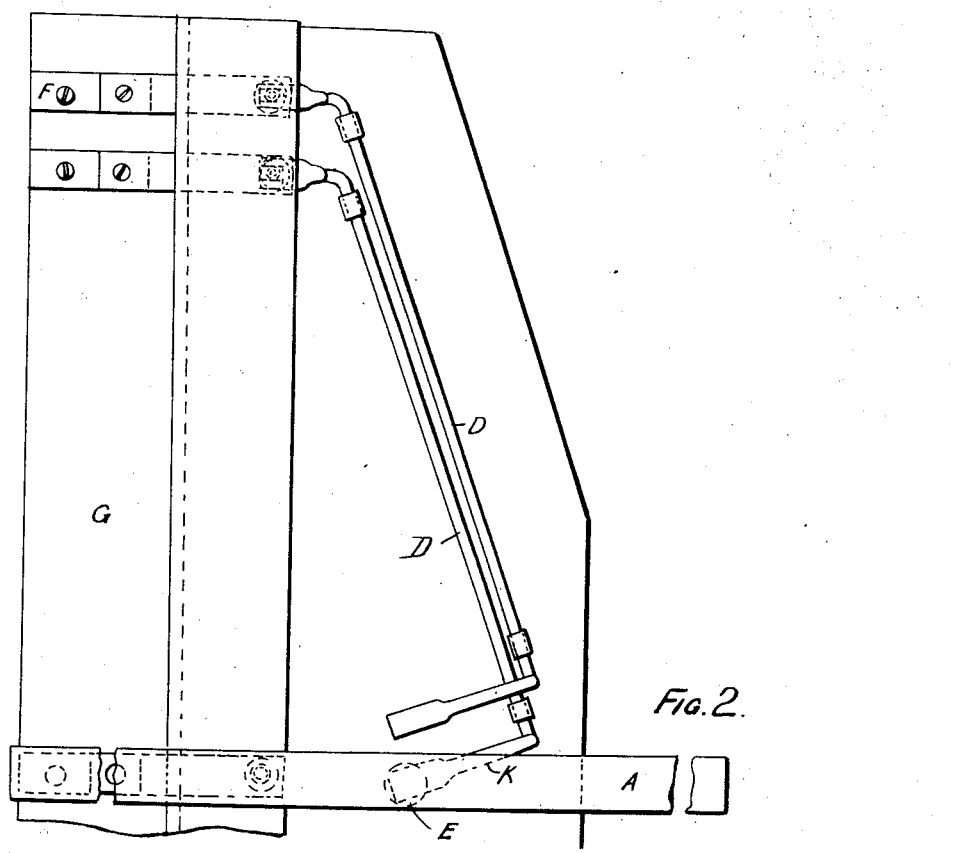

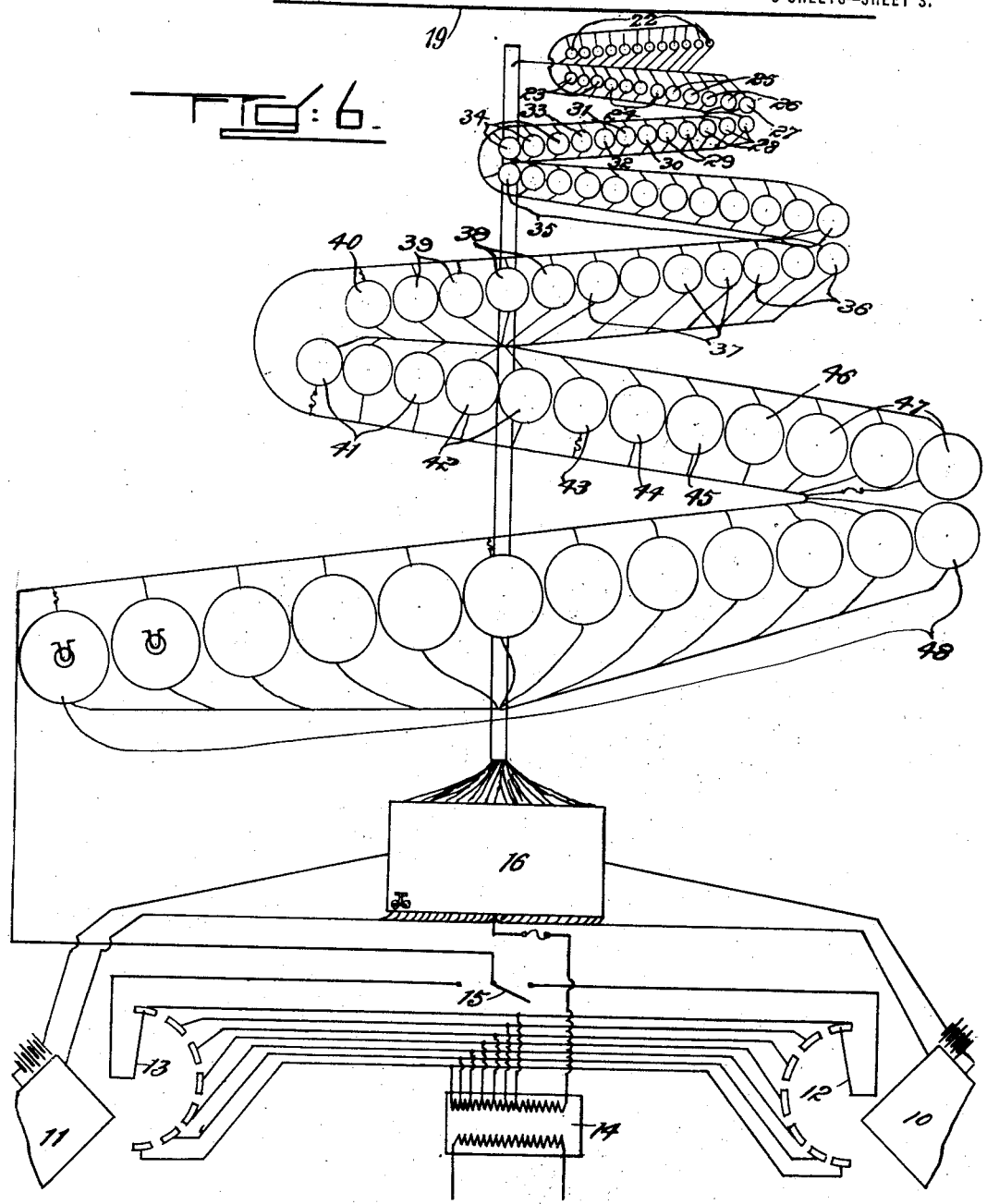

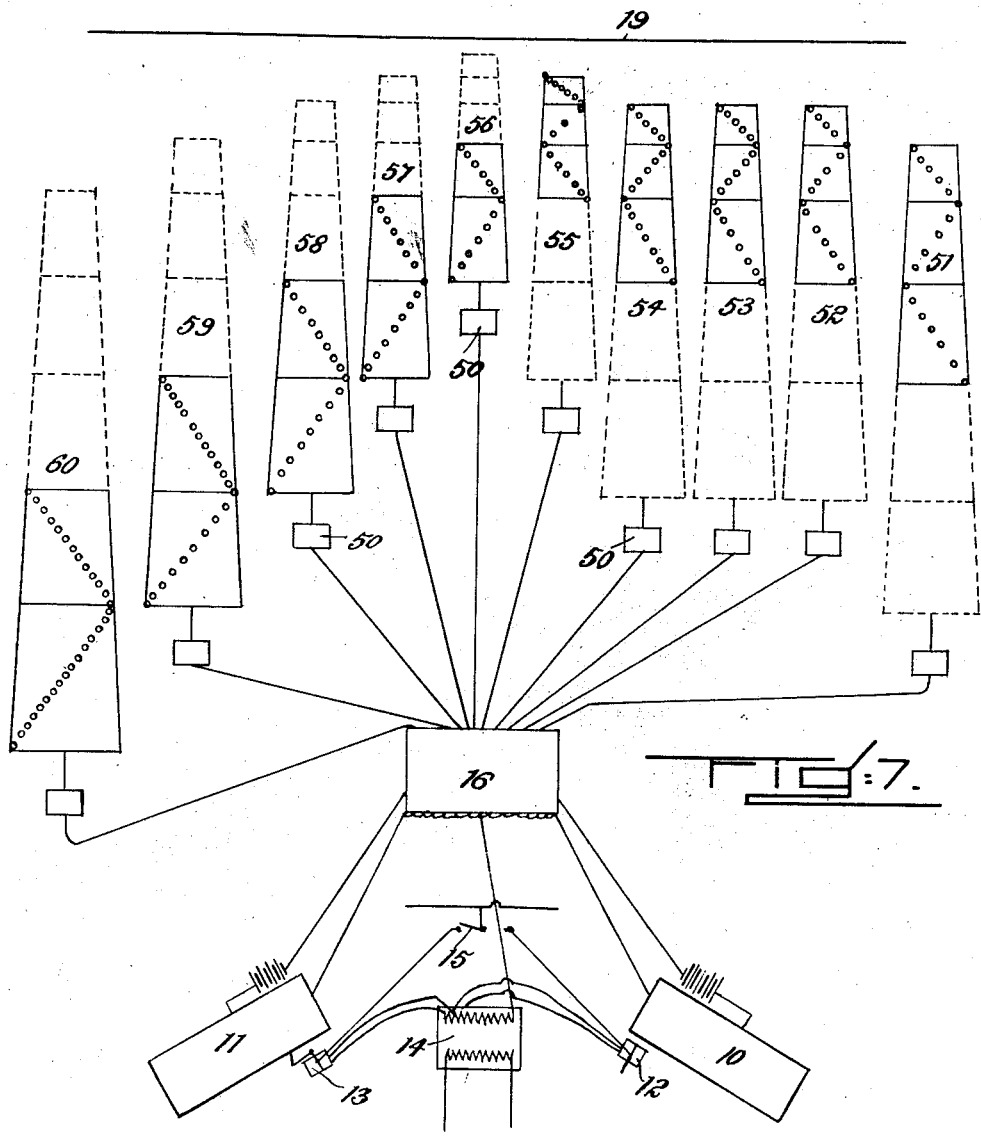

A. B. HECTOR.
PRODUCTION OF COLOR MUSIC AND OTHER LUMINOUS EFFECTS AND APPARATUS THEREFOR.
APPLICATION FILED JUNE 8, 1917.

1,432,552.  Patented Oct. 17, 1922.
5 SHEETS—SHEET 5.

Patented Oct. 17, 1922.

1,432,552

UNITED STATES PATENT OFFICE.

ALEXANDER BURNETT HECTOR, OF GREENWICH, NEAR SYDNEY, NEW SOUTH WALES, AUSTRALIA.

PRODUCTION OF COLOR MUSIC AND OTHER LUMINOUS EFFECTS AND APPARATUS THEREFOR.

Application filed June 8, 1917. Serial No. 173,672.

*To all whom it may concern:*

Be it known that I, ALEXANDER BURNETT HECTOR, a subject of the King of Great Britain, residing at Greenwich, near Sydney, in the State of New South Wales, Commonwealth of Australia, have invented certain new and useful Improvements in the Production of Color Music and Other Luminous Effects and Apparatus Therefor, of which the following is a specification.

This invention relates to improvements in my prior British Patent No. 29,615 of 1912 and to improvements covered by a further application for patent filed June 8, 1917, Serial No. 173,671 and consists firstly in the means for forming what I term "scales of colors" controlled by the individual keys of an organ, piano, or other keyed instrument in definite ratios of space occupied by the various colors in the normal solar spectrum; secondly, in the means whereby the stops of an organ operate switches to illuminate electric lamps of a candle power and reflectors with an area in definite ratios; and, thirdly, in the particular apparatus whereby the various colored electric lamps so positioned and arranged are controlled by the keys to make and break contacts or diminish or increase the intensity of the lamps.

It is well known (see for example, "Modern Chromatics," by Ogden N. Rood, page 24) that if the space occupied by the normal solar spectrum be divided into, say, 1,000 parts, the various colors occupy different proportions of this space, the ratios for each color being as shown in the following table A.

Table A.

| | |
|---|---|
| Red | 330 |
| Orange red | 104 |
| Orange | 25 |
| Orange yellow | 26 |
| Yellow | 13 |
| Greenish yellow and yellowish green | 97 |
| Green | 87 |
| Blue green | 16 |
| Cyan blue | 51 |
| Blue | 74 |
| Violet blue | 117 |
| Violet | 60 |

In applying these ratios to form my scale of colors controllable by the keys of an organ, I commence with the lowest bass note and proceed upwardly through the first four octaves or 48 notes as follows:—

Table B.

| (Bass notes). | Keys. | | Lamps or series of lamps. |
|---|---|---|---|
| Reds | 15 | = | 15 |
| Orange reds | 5 | = | 5 |
| Oranges | 2 | = | 2 |
| Orange yellow | 1 | = | 1 |
| Yellow | 1 | = | 1 |
| Greenish yellow and yellowish green | 5 | = | 5 |
| Green | 4 | = | 4 |
| Blue green | 1 | = | 1 |
| Cyan blue | 2 | = | 2 |
| Blue | 4 | = | 4 |
| Violet blue | 6 | = | 6 |
| Violet | 2 | = | 2 |
| (Treble notes). | | | |

The remaining thirteen treble notes are tinted in varying degrees of violet pink and light pink, merging into white light.

The sub-base stop controls lamps of a hue descending from violets and purples to blues and greens of the deepest hue, the lowest note being greenish yellow, in the following ratios:—

| | Keys. | | Lamps or series of lamps. |
|---|---|---|---|
| Violet | 3 | = | 3 |
| Violet blue | 6 | = | 6 |
| Blue | 4 | = | 4 |
| Cyan blue | 2 | = | 2 |
| Blue green | 1 | = | 1 |
| Green | 4 | = | 4 |
| Yellowish green and greenish yellow | 4 | = | 4 |

This arrangement of color in the ratios set forth would also apply in the case of a piano or other keyed instrument, it is of fundamental importance, and it would apply to all apparatus outlined in my prior British Patent No. 29,615 of 1912.

This scale of ratio of the spectrum colors may be arranged over the various keys and octaves in several ways to suit different classes of music. These arrangements are conveniently shown in the following, wherein $x$ denotes any suitable constant:—

*Table C.*

| Octaves (treble). | Color. | Hue. |
|---|---|---|
| 1st octave 12 keys | White | Depth $1x$ |
| 2nd octave 12 keys | Violet to red | Depth $2x$ |
| 3rd octave 12 keys | | |
| 4th octave 12 keys | | |
| 5th octave 12 keys | Violet to red | Depth $4x$ |
| 6th octave 12 keys | | |
| 7th octave 12 keys | | |
| (Bass). | | |

*Table D.*

| Octaves (treble). | Color. | Hue. |
|---|---|---|
| 1st 12 keys | White | Depth $1x$ |
| 2nd 12 keys | Violet to red | Depth $2x$ |
| 3rd 12 keys | | |
| 4th 12 keys | Violet to red | Depth $4x$ |
| 5th 12 keys | | |
| 6th 12 keys | Violet to red | Depth $8x$ |
| 7th 12 keys | | |
| (Bass.) | | |

*Table E.*

| Octaves (treble). | Color. | Hue. |
|---|---|---|
| 1st 12 keys | White | Depth $1x$ |
| 2nd 12 keys | Violet to red | Depth $2x$ |
| 3rd 12 keys | Violet to red | Depth $4x$ |
| 4th 12 keys | Violet to red | Depth $8x$ |
| 5th 12 keys | Violet to red | Depth $16x$ |
| 6th 12 keys | Violet to red | Depth $32x$ |
| 7th 12 keys | Violet to red | Depth $64x$ |
| (Bass.) | | |

It is well known that when a given stop is pulled out in an organ, sound of a given volume and quality is produced, the volume increasing as a 2 feet, 4 feet, 8 feet, 16 feet and sub-base or 32 feet stops and so on is operated upon. Arrangements are made so that these stops operate a given switch bringing into light lamps of a candle power, reflectors with an area, and color of a hue or shade in the following ratio, $x$ denoting any suitable predetermined unit or constant which is the same throughout any given column, but not necessarily the same in different columns.

*Table F.*

| Stops. | Ratios of candle-power. | Area of reflectors. | Depth of shade or color. | Thickness of lamp filament. |
|---|---|---|---|---|
| 2 feet | $2x$ | $2x$ | $2x$ | $2x$ |
| 4 feet | $4x$ | $4x$ | $4x$ | $4x$ |
| 8 feet | $8x$ | $8x$ | $8x$ | $8x$ |
| 16 feet | $16x$ | $16x$ | $16x$ | $16x$ |
| 32 feet | $32x$ | $32x$ | $32x$ | $32x$ |
| 64 feet | $64x$ | $64x$ | $64x$ | $64x$ |

In the accompanying drawings,

Figures 1 and 2 are respectively, a side view and plan of part of an American organ illustrating my apparatus for effecting contact of each key to control its particular lamp.

Figure 6 is a diagrammatic view illustrating an arrangement of lamps in accordance with Table C.

Figure 7 is a diagrammatic view illustrating a series of banks of lamps.

The same reference characters indicate the same or like parts in the several views.

Figure 9:
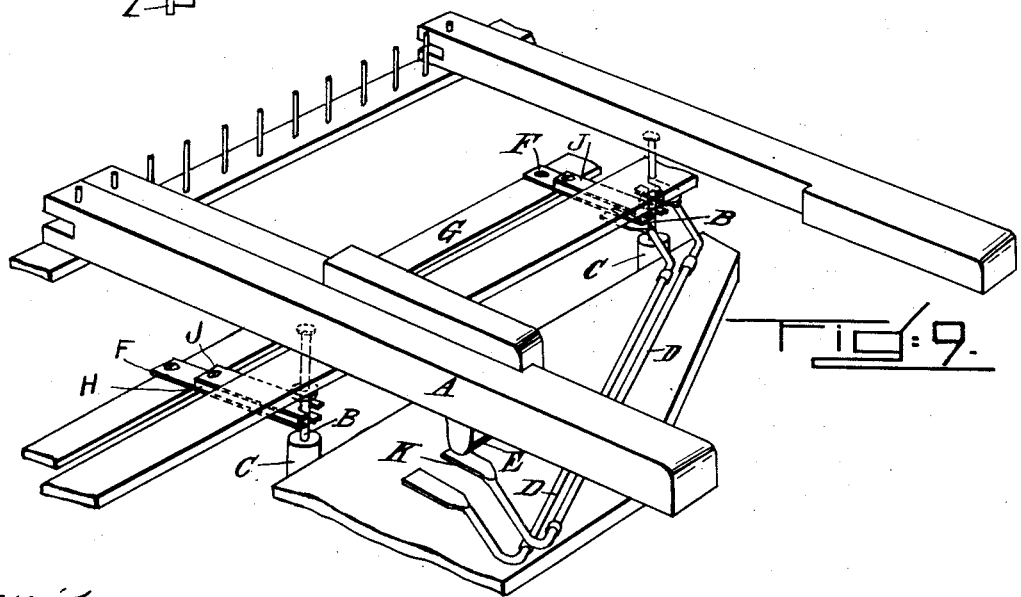
Figure 9 is a perspective view of the parts shown in Figures 1 and 2.

Referring to Figs. 1, 2 and 9 A is a key of an American organ which when depressed causes the plunger B to operate on a sticker C to release the air pressure and produce a given sound. Also when the octave coupler is pulled out it raises a series of levers D bringing them in contact with lugs E situated underneath each key A so that for every key depressed the octave above is also sounded.

In my apparatus I utilize these movements to close a series of electrical contacts placed underneath the plungers which contacts control one or more lamps for each plunger and consequently for each key.

To effect this I provide a piece of ebonite or other suitable insulating material G the length of the keyboard and to this is screwed a series of metal strips F equalling the number of keys. Above each of these is screwed another insulating piece H also bearing a metal strip J registering with the corresponding strips F, the several pairs of strips J and F being capable of being brought into contact by the movements of the various plungers B when the corresponding key A is depressed. I thereby form a series of switches arranged in parallel with a common return and a lamp or series of lamps is illuminated by the current on the depression of each key A. When an octave coupler as D is pulled out as will be understood the arm K is brought close to the lug E so that when the key A is depressed the octave key corresponding to A is depressed by the coupler rod. At the same time the two sets of contacts F, J (Fig. 5), are closed and two lamps or series of lamps—corresponding to key A and its octave—are illuminated.

Figure 3:
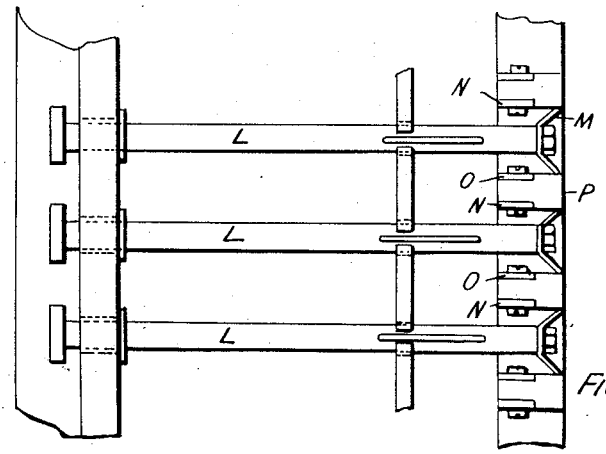
Figures 3 and 4 represent in plan and elevation an arrangement of stops on an American organ for bringing in lamps of the required candle power.
Figure 5:
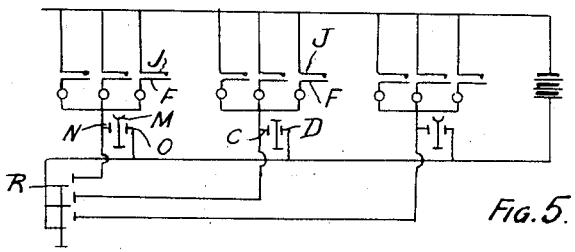
Figure 5 is a diagrammatic drawing illustrating means for bringing in all the lamps simultaneously by a master switch actuated by the left knee swell.
Figure 4:
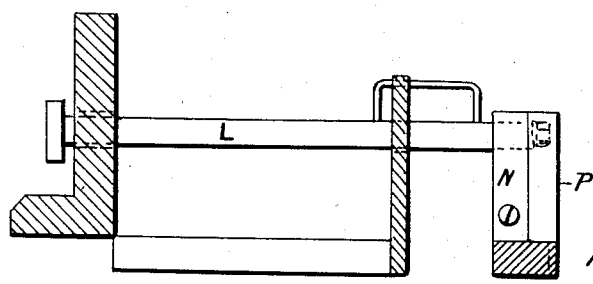

In Figures 3 and 4 are illustrated devices controlled by the stops of an organ for bringing in lamps of the desired candle power. L represents the stops to the end of each of which is fixed a contact piece M capable of completing an electric circuit between the contacts N and O when one of the stops is pulled out, the contacts N and O being carried on the insulated support P. These contacts N and O are connected in the lamp and battery circuit as shown in Fig. 5, and upon pulling out any stop and completing the circuit through N M and O the current from a battery or other source is made to flow to one side of each switch under a certain number of keys corresponding in number to those controlled by the stop which is withdrawn. On depressing any key the electric circuit is completed through the switch under the key as shown clearly in Figure 5.

By means of the master switch R actuated by the left knee swell all the lamps may be illuminated simultaneously, as will be understood from Fig. 5.

Figure 8:
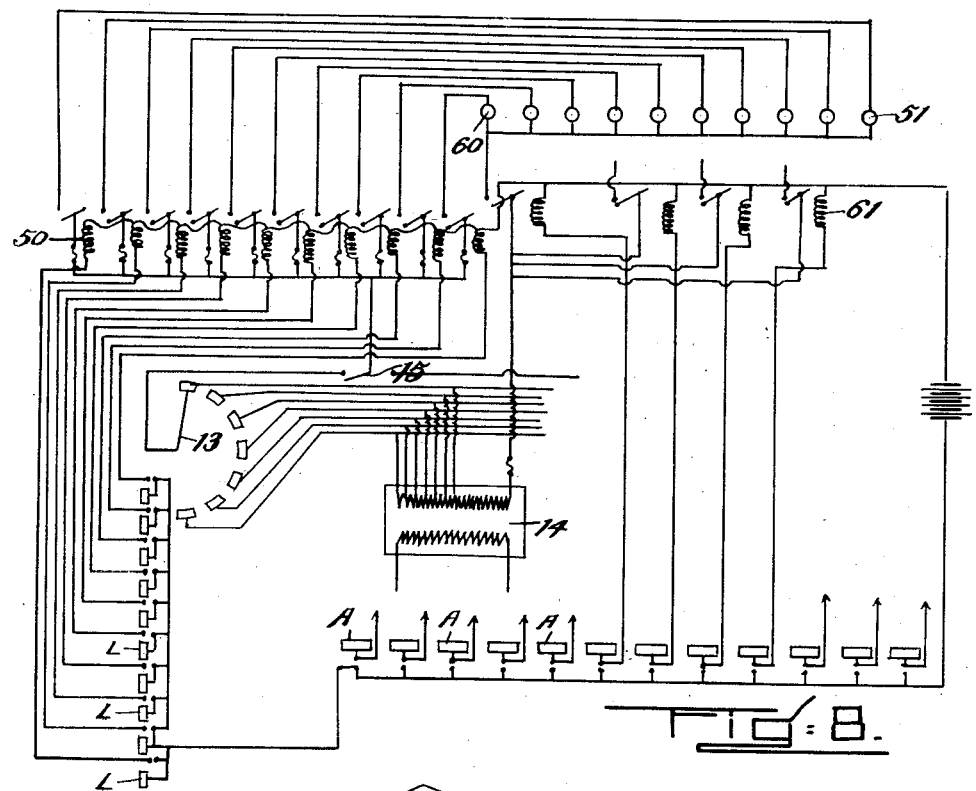
Figure 8 is a diagrammatic view of the wiring for the series of banks of lamps shown in Figure 7.

An embodiment of the invention in a complete system is diagrammatically illustrated in Figures 6, 7, and 8.

Referring to Figure 6, 22 represents twelve white lamps, the first of which is spaced $1x$ ($x$ being any suitable unit distance) from the screen 19, the remaining eleven lamps being gradually spaced up to about $2x$. Then follows:—

23, representing 3 violet colored lamps, 24, representing 4 violet blue colored lamps, 25, representing 2 blue colored lamps, 26, representing 2 cyan blue colored lamps, 27, representing 1 blue green colored lamp, spaced from $2x$ to about $4x$.

28, representing 3 green colored lamps, 29, representing 2 yellowish green colored lamps, 30, representing 1 greenish yellow colored lamp, 31, representing 1 yellow colored lamp, 32, representing 1 orange yellow colored lamp, 33, representing 1 orange colored lamp, 34, representing 3 orange red colored lamps, spaced from $4x$ to about $8x$.

35, representing 12 red colored lamps varying in intensity of hue, spaced from $8x$ to about $16x$.

36, representing 3 violet colored lamps, 37, representing 4 blue violet colored lamps, 38, representing 2 blue colored lamps, 39, representing 2 cyan blue colored lamps, 40, representing 1 blue green colored lamp, spaced from $16x$ to about $32x$.

41, representing 3 green colored lamps, 42, representing 2 yellowish green colored lamps, 43, representing 1 greenish yellow colored lamp, 44, representing 1 yellow colored lamp, 45, representing 1 orange yellow colored lamp, 46, representing 1 orange colored lamp, 47, representing 3 orange red colored lamps, spaced from $32x$ to about $64x$.

48, representing 12 red colored lamps, spaced from $64x$ to about $128x$ distance from the screen.

Referring to Figure 7, 10 is a player piano and 11 an organ having controllers 12 and 13 respectively operated by the sound volume varying means of the instrument, 14 is a transformer, 15 a double throw switch, and 19 the screen.

50 (see also Fig. 8) represents master relays controlled respectively by the switches M, N, O, (Figs. 3 and 4) of the several stops L. Each of the relays 50 controls one of a series of banks of lights 51 to 60 similar respectively to the single bank or unit illustrated in Figure 6 and varying in size and distance from the screen 19 in ratio to the sound or size of pipe or reed used on withdrawing a given draw stop or stops of the organ. Each of the instrument keys A controls, through its switch F, J, a lamp relay 61. Each lamp relay 61 controls all lamps of the same color value but of different sizes and intensities, while each master relay 50 controls all lamps of the same intensity but of different colors.

In Figure 7 the lamps shown in full lines may be operated by a draw stop in the same way as the reeds or pipes of an organ. An individual stop of some organs controls the whole of the sixty one notes of the organ, while in other organs the stops are divided into bass (twenty-four keys) and treble (thirty-seven keys). The precise arrangement of the apparatus may be considerably varied in accordance with the particular construction of organ or other instrument, a lamp being added for each individual reed or pipe employed. The main object has been to provide apparatus which synchronizes sound and color in accordance with the geometrical progression set forth in the foregoing tables. It will, of course be understood that the figures given in these tables are merely illustrative and that others may be adopted according to the requirements so long as the fundamental proportions are maintained.

Having thus described my invention what I claim as new and desire to protect by Letters Patent, is—

1. An apparatus of the character described comprising a musical instrument having a series of keys embracing a range in excess of a single octave, and a series of devices for displaying lights of different colors, means for controlling said devices from the respective keys of said series, the relative arrangement of said keys and color displaying devices being such that as the several keys of the complete series of keys are successively operated in the order of the note scale the colors will be displayed in the order in which they appear in the solar spectrum, such lights progressing geometrically in intensity relatively to increases in the sounds produced by the different notes of the note scale.

2. An apparatus of the character described comprising a musical instrument having a series of keys embracing a range in excess of a single octave and means for varying the volume of sound produced by said instrument, a series of devices for displaying lights of different colors, means for controlling said devices by the respective keys of said instrument, the relative arrangement of said keys and devices being such that as the several keys of the complete series of keys are successively operated in the order of the note scale the colors will be displayed in the order in which they appear in the solar spectrum and the intensity of the lights will progress geometrically relatively to increases in the sounds produced by the different notes of the note scale, and means operatively connected with the sound volume varying means of said instrument for relatively varying the intensity of the light displayed.

3. An apparatus of the character described comprising a musical instrument having a series of keys representing a plurality of octaves, a series of devices for displaying lights of different colors, and means for controlling said devices from the respective keys of said series the devices controlled by the keys of different octaves displaying colors of different hues and the lights controlled by the keys of each octave progressing geometrically in intensity relatively to increases in the sounds produced by the key of the respective octave.

In testimony whereof I have hereunto set my hand.

ALEXANDER BURNETT HECTOR.

Witnesses:
CHARLES E. GRAHAM,
HENRY W. CLARKE.